United States Patent [19]

Bellio et al.

[11] Patent Number: 5,380,773
[45] Date of Patent: Jan. 10, 1995

[54] BITUMENS MODIFIED WITH RECYCLED AND/OR VIRGIN POLYMERS AND THEIR APPLICATIONS

[75] Inventors: Emanuele Bellio, Ragusa; Michele Ficili, Scicli; Nicola Patti, Ragusa, all of Italy

[73] Assignee: ECP Enichem Polimeri S.r.L., Milan, Italy

[21] Appl. No.: 992,628

[22] Filed: Dec. 18, 1992

[30] Foreign Application Priority Data

Dec. 23, 1991 [IT] Italy .................. MI.91-A/003478

[51] Int. Cl.⁶ ............................................. C08L 95/00
[52] U.S. Cl. ......................................... 524/68; 524/59; 524/62; 428/280; 428/290; 428/291
[58] Field of Search ................ 524/59, 69, 62, 68

[56] References Cited

U.S. PATENT DOCUMENTS

| | | | |
|---|---|---|---|
| 2,871,212 | 1/1959 | Thayer | 524/59 |
| 3,853,800 | 12/1974 | Haberi | 524/59 |
| 3,980,598 | 9/1976 | Moorwessel et al. | 524/69 |
| 4,868,233 | 9/1989 | Moran | 524/59 |
| 4,975,476 | 12/1990 | Wolfe | 524/59 |

FOREIGN PATENT DOCUMENTS

| | | |
|---|---|---|
| 0205744 | 12/1986 | European Pat. Off. . |
| 0205796 | 12/1986 | European Pat. Off. . |
| 0299700 | 1/1989 | European Pat. Off. . |
| 0315239 | 5/1989 | European Pat. Off. . |
| 1387367 | 1/1964 | France . |
| 1387367 | 11/1965 | France . |
| 2152090 | 9/1972 | France . |
| 2152090 | 4/1973 | France . |
| 2263103 | 3/1975 | France . |
| 2146903 | 3/1973 | Germany . |
| 1251494 | 10/1971 | United Kingdom . |
| 2219802 | 12/1989 | United Kingdom . |
| 2223229 | 4/1990 | United Kingdom . |
| 87/04174 | 7/1987 | WIPO . |

OTHER PUBLICATIONS

G. Bonfiglio (Nov. 72) *Plastic Materials and Elastomer*, vol. 38(11).

*Primary Examiner*—James J. Seidleck
*Assistant Examiner*—M. L. Warzel
*Attorney, Agent, or Firm*—Rogers & Wells

[57] ABSTRACT

A description follows of bitumens modified with recycled and/or virgin polymers, such as polyethylene (PE) and ethylene-vinylacetate copolymer which, having special structural and morphological characteristics, give an improved performance with respect to bitumen as such or modified with traditional polymers; the mixtures thus obtained are used for street paving or different kinds of waterproofing.

15 Claims, No Drawings

BITUMENS MODIFIED WITH RECYCLED AND/OR VIRGIN POLYMERS AND THEIR APPLICATIONS

The present invention relates to bitumens modified with recycled and/or virgin polymers, such as PE and ethylene-vinylacetate copolymer which, having special structural and morphological characteristics, give a better performance compared to bitumen as such or as modified with traditional polymers; the mixtures thus obtained are used for street paving or different kinds of waterproofing.

It is generally known that a minimum thermal susceptibility is required in the use of bitumens; in fact the use of bitumen as such causes stiffening at low temperatures making it fragile to light impacts, whereas at temperatures higher than 30°-40° C. its viscosity is so low that it flows spontaneously or becomes permanently deformed even under slight mechanical stress.

From the economical point of view, it should be noted that the cost of modifying polymers is by far the highest of the formulation components; the incidence of the cost of the polymer on the total mass will obviously depend on the formula used.

To overcome these limits, research in the field has proposed bituminous compositions wherein a bitumen is mixed with an organic polymer, especially elastomers of the styrene-butadiene family or atactic polypropylene (PPa).

In fact, U.S. Pat. No. 315,239 claims a bituminous composition for waterproofing sheaths composed of bitumen and virgin LLDPE (linear low density polyethylene).

Also Patents GB 2,219,802 and GB 2,223,229 use virgin LDPE (low density polyethylene) in the bituminous composition; in addition, in these patents, the Melt-Flow Index of the composition ranges from 0.2 to 2.

EP Patents 205,774 and EP 205,796 claim bituminous masses composed of a bitumen, obtained with a Visbreaking process, modified with styrene-butadiene rubbers and with PE which is not better identified from a structural point of view.

In a single example and single claim it is specified that the bituminous mass contains the PE alone in a weight percentage, with respect to the total mass, of up to 12%.

The addition of these polymers improves various characteristics of the bitumen, and the bituminous mixtures obtained have an interesting applicative performances but are extremely viscous in the processing phase.

These compositions are coupled with lithic materials having a special morphology, for the preparation of bituminous conglomerates or, at times, with the addition of a mineral charge and combined with a reinforcement, in the form of waterproofing sheaths used in construction for floor lining.

In the field of bituminous conglomerates for street paving, the applicative problem lies in the necessity of having bituminous binders which are very slightly susceptible to the effects of temperature.

For this reason polymers, and particularly elastomers, are used for modifying the bitumens.

It has recently been proposed, in Patent Application IT 19732 A/88, to use mixtures of plastic materials deriving from solid urban residues for modifying the bitumens used in the above bituminous conglomerates which brings an improvement even in the technological performance.

The use of bituminous binders with a better performance with respect to bitumen as such, is indispensable in the case of phonoabsorbing or self-draining street pavements.

In the field of waterproofing and with respect to PPa, this material is capable of giving interesting characteristics to bitumen when it is used in relatively high proportions with respect to the bitumen.

Unfortunately bituminous compositions with a high content of PPa do not have sufficient dimensional stability, and can therefore be easily deformed under minimum mechanical stress, under average-high temperatures and, in these conditions, the behaviour to "treading" and spontaneous slipping on an inclined plane is compromised.

Attempts have been made in the art to find a solution to this draw-back by adding a fraction of isotactic polypropylene to the composition, in addition to the inorganic charges; this has reduced but not sufficiently solved the problem.

Another undesired characteristic of the bitumen/PPa compositions consists in their limited resistance to ageing.

The necessity has consequently been felt for improving the bituminous compositions and for this purpose attempts have been made to use other polymers in substitution of both PPa and those previously mentioned in the above patents.

This necessity is more widely felt due to the diminished availability of PPa on the market in that its production ceased in all the main industrialized countries at the end of the 70's following the introduction of new catalytic systems with a high yield and stereospecificity and, in fact, the PPa which is still present on the market is that which has been recovered from deposits where it was stored in the past years.

However the substitution of PPa with organic polymers which are widely available such as PE and/or its copolymers with vinyl acetate, have not been able to solve the above problems, as specified by F. Schieroni in his article "Bituminous Sheaths and Waterproofing of Viaducts", published by the magazine "Impermeabilizzare" (Waterproofing) n.4 (1977).

The reason lies in the difficulty of compatibility between the above polymers and bitumens if the former are not suitably selected in terms of molecular weight and crystallinity.

In all cases, substitution with virgin polymers has not proved to be advantageous, so far, from an economical point of view, because of the high costs of these, and all of the above elastomers, with respect to PPa.

This approach has consequently not been significantly established so far for industrial production.

To overcome the above draw-backs, the inventors have now found that by modifying the bitumen with virgin polymers and mainly recycled polymers which have special structural and morphological characteristics, it is possible to obtain formulations which can guarantee a technological-applicative performance similar or better than with those presently being used and at a more advantageous cost due to the fact, naturally, that recycled polymers are used and also because the above polymers are virgin, which are definitely more economical compared to elastomers, for example.

The present invention consequently relates to bitumens modified with recycled and/or virgin polymers, such as PE and ethylene-vinylacetate copolymer which, having special structural and morphological characteristics, give a better performance with respect to bitumen as such or modified with traditional polymers. The mixtures thus obtained are used for street paving or different kinds of waterproofing.

In accordance with this the bituminous composition of the present invention is characterized in that it contains:
a) bitumen; and
b) at least one polymer selected from: recycled and-/or virgin PE, ethylene-vinylacetate copolymer (EVA), PE waxes or mixtures of these.

When a recycled PE, whatever its origin, and/or virgin polymer is used, this will have density values of between 0.870 and 0.970 g/ml and a Melt-Flow Index value of between 2 and 200.

These ranges of Melt-Flow and density may be reached by mixing different types of PE having Melt-Flow Index and density values outside the above ranges.

According to a preferred method the composition of the present invention contains a PE having a density value ranging from 0.910 and 0.930 g/ml and a Melt-Flow index value of between 20 and 70.

The composition of the present invention many generally contain from 1 to 30 parts by weight of PE for every 100 parts by weight of bitumen.

In the preferred applicative method this composition contains from 15 to 25 parts by weight of PE for every 100 parts by weight of bitumen.

When virgin or recycled EVA, whatever its origin, is used it will have Melt-Flow Index values of between 0.3 and 500 and a vinylacetate content ranging from 1 to 50% by weight with respect to the total copolymer.

According to a preferred applicative method the characteristics of EVA are: Melt-Flow Index within the values 5-50 and vinylacetate content of 20-40%.

These ranges of Melt-Flow Index and vinylacetate content may be reached by mixing different types of EVA having Melt-Flow Index values and vinylacetate content outside the above ranges.

The composition of the present invention has a ratio between EVA and total polymers, i.e. EVA+PE, ranging from 1 to 50% and preferably between 10 and 40%.

If the polymers have been recycled it often happens that their Melt-Flow Index values are outside the above values or that the density is higher than the expected value; in these cases, as the characteristics are not suitable for an optimum modification of the bitumen, they should be modified by "reactive extrusion" or "reactive processing" until they correspond to the previously defined values.

When waxes are used, these have a weight molecular weight (Mw) of between 3000 and 6000; they can be used in a percentage of between 1 and 40 by weight with respect to the total polymers, i.e. PE+EVA+-waxes, and preferably between 5 and 10%.

Waxes are generally used to reduce the viscosity in the processing phase, without greatly influencing the final performance of the mixture.

Bitumens which are suitable for the purpose are those, of various origins, which generally have penetration values ranging from 40 to 300 mm (according to ASTM D-5) and with ball-ring values ranging from 60° to 30° C. (according to ASTM D-36); the preferred bitumens are those coming from distillation (from Vacuum).

The composition of the present invention may contain, in addition to the bitumen and above polymers, one or more compatibilizing agents usually selected from fillers, pigments, stabilizers and dyes.

Among these it is preferable to use 3-methoxyethoxyethoxyethoxypropyl-tri(methoxyethoxyethoxyethoxy)-silane (MTG Silane), commercially produced under the trade-name HULS.

The compositions of the present invention have good general characteristics, including those relating to their processability in the preparation phase and application of the products; in addition, in the waterproofing field, these compositions have much better "treading" characteristics.

The basic advantages of using recycled polymers are that they reduce the volumes of the polymers to be disposed after use, thus contributing to solving problems relating to environmental pollution, and they also improve the applicative performance of the bitumens.

A further advantage derives from the fact that in the present formulations continuity in the polymeric phase is reached (inversion point of the matrix) at ratios of polymer/bitumen which are considerably lower than those obtained with the use of PPa; in this composition the ratio polymer/bitumen never exceeds 0.14 whereas in the case of PPa this value is 0.20.

As a result in the present composition a typical performance of the polymers is reached using quantities which are much lower than those in the method with PPa.

A third advantage lies in an improved behaviour of the composition to treading, as can be seen in Table 4 which shows data relating to mechanical deformation at high temperatures (print).

It can be noted from the above table that, to obtain a valid comparison of the behaviour to temperature and charge between the present composition and the mixtures obtained with PPa, it is necessary to considerably increase the concentration of PPa with respect to the concentration of the recycled polymers.

The composition is useful for lining and insulating, for example pipes and tanks even underground; this composition can be used mainly for the preparation of waterproofing sheaths, combined with a reinforcement selected from felts, fabrics and laminates of organic and/or inorganic material.

The reinforcement is preferably selected from non-woven fabrics of polyester and fiberglass web.

These sheaths have a typical thickness of about 2-8 mm and can be prepared with the usual procedures, known in the art, such as for example that described by G. Bonfiglio in the article "Manti prefabbricati e resine per le coperture" (Prefabricated coatings and resins for lining.) published by the magazine Materie Plastiche ed Elastomeri (Plastic materials and Elastomers), 38, no.11, November 1972.

The sheaths are useful for waterproofing coatings in construction and civil works in general, for example for coating and waterproofing floors, vertical walls, terraces, viaducts and tanks for collecting water.

The sheaths can be surface-lined with a metallic sheet (for example of aluminium or copper) for protective and/or aesthetic purposes; in the same way a surface-lining of marble or slate grit can be applied.

With respect to the characteristics of the products used, these are summarized in Table 1.

The experimental examples which follow provide a better illustration of the present invention but do not limit it in any way.

EXAMPLE 1 (COMPARATIVE)

500 g of bitumen are placed in a 2 liter metallic container, equipped with a mechanical stirrer.

The product is heated under stirring up to 180° C., whereupon 100 g of PPa are added and the stirring is continued, keeping the temperature constant, until it has completely melted and is then homogenized for 1 hour.

The mixture obtained is poured into suitable containers to supply test samples upon which the characterization tests listed in Table 2 are carried out.

The subsequent examples (from 2 to 20) are carried out with the same method used in Example 1; the results are shown in Table 3.

TABLE 1

| CHARACTERISTICS OF PRODUCTS | | | |
| --- | --- | --- | --- |
| BITUMEN (type) | 180/200 | 80/100 | 270/300 |
| Insol. n.C5 (%) | 13,1 | 24,1 | 6,15 |
| Insol. n.C7 (%) | 4,2 | 10,05 | 13,0 |
| Polar resins (%) | 51,95 | 35,7 | 45,2 |
| Saturated compounds (%) | 9,34 | 9,81 | 15,2 |
| Aromatic compounds (%) | 21,69 | 20,33 | 20,3 |
| Ball-ring (°C.) | 42 | 47 | 35 |
| Penetration (dmm) | 185 | 80 | 270 |
| Viscosity (dPa*s) | 0,48 | 0,52 | 0,46 |
| POLYETHYLENE (source) | virgin | recicled (1) | recicled (1) |
| MFI (g/min) | 20,2 | 0,17 | 0,3 |
| Density (g/cc) | 0,916 | 0,922 | 0,954 |
| Intrinsic viscosity (dl/g) | 0,8 | 1,2 | 2,03 |
| Melting point (°C.) | 105 | 109 | 134 |
| Crystallinity (%) | 38 | 41 | 78 |
| EVA (type) | | 28/25 | 33/45 |
| MFI (g/min) | | 28,1 | 46 |
| V.A. (%) | | 28 | 33 |
| Intrinsic viscosity (dl/g) | | 0,73 | 0,7 |
| Melting point (°C.) | | 68,3 | amorphous |
| Crystallinity (%) | | 38 | — |
| POLYETHYLENE WAXES | | | |
| Intrinsic viscosity (dl/g) | | 0,15 | |
| Weight aver. molecular weight | | 4390 | |
| PPA | | | |
| Intrinsic viscosity (dl/g) | | 0,5 | |

(1) thereafter modified

TABLE 2

| ANALITICAL METHODS | |
| --- | --- |
| BITUMEN COMPOSITION | ASTM D-2007-86 and IP 143/82 |
| THERMO-ANALYSIS | Heating-cooling cycle at a rate of 5° C./min. |
| MELT FLOW INDEX | ASTM D-1238 (procedure A and B) |
| DENSITY | ASTM D-1505 |
| VISCOSITY | 180° C., 13 sec |
| SOFTENING POINT | (Ball-Ring) IP 58 |
| PENETRATION | ASTM-D 5-71 |
| PRINTING | 24 hours conditioning 23° C. (when not otherwise indicated) 1 Kg (when not otherwise indicated) 30 sec. (when not otherwise indicated) on a 6 mm diameter ball |
| FLEXIBILITY | Aschimici method-IGLAE ("Impermeabilizzare" n. 4, 1976; diameter 20 mm, 10 sec.) |

TABLE 3

| EXAMPLE N. | BITUM. PEN. dmm | 1st POLYMER TYPE | 1st POLYMER MF12 | EVA VA % | EVA MFI g/10³ | EVA/ (EVA + PE) % | Compos. (bit. = 100) POLIMER parts | Compos. (bit. = 100) Car. parts | P.A. °C. | Viscosity dPa*s | Print. dmm | Penetr. dmm | Flex. °C. | DSC °C. | DSC % Cr |
| --- | --- | --- | --- | --- | --- | --- | --- | --- | --- | --- | --- | --- | --- | --- | --- |
| COMP. 1 | 185 | PPA | — | — | — | — | 20 | 0 | 92 | 1,7 | >=80 | 59 | −8 | amorphous | — |
| COMP. 2 | 185 | PPA | — | — | — | — | 23 | 0 | 92 | 2 | >=80 | 60 | −10 | amorphous | — |
| COMP. 3 | 185 | PPA | — | — | — | — | 30 | 0 | 140 | 2,6 | 45 | 36 | −10 | — | — |
| COMP. 4 | 185 | PPA | — | — | — | — | 30 | 38 | 147 | — | 40 | 30 | −8 | — | — |
| COMP. 5 | 185 | SBR Eniche | — | — | — | — | 14 | 0 | 134 | 8,5 (2) | 7,1 | 45 | <=25 | — | — |
| 6 | 80 | LDPE virg. | 20,2 | — | — | 0 | 20 | 0 | 102 | 12,40 | 21 | 21 | 0 | 98,4 | 6,5 |
| 7 | 185 | — | — | 28 | 28,1 | 100 | 20 | 0 | 60 | 4,8 | 62 | 44 | −10 | amorphous | — |
| 8 | 185 | — | — | 33 | 46 | 100 | 20 | 0 | 58 | 3,6 | 77 | 46 | −12 | amorphous | — |
| 9 | 185 | LDPE rec. | 8,3 | — | — | 0 | 20 | 0 | 106 | 9,20 | 20 | 43 | −6 | 102,3 | 6,099 |
| 10 | 185 | LDPE rec. | 77,3 | — | — | 0 | 16 | 0 | 104 | — | 45 | 36 | −4 | 105,2 | 3,666 |
| 11 | 185 | LDPE rec. | 77,3 | — | — | 0 | 20 | 40 | 104 | 6 | 21 | 26 | −4 | 105,0 | 3,69 |
| 12 | 185 | LDPE rec. (3) | 16 | — | — | 0 | 20 | 0 | 103 | 2 | >=80 | 55 | −4 | 101,5 | 3,6 |
| 13 | 185 | LDPE rec. | 53 | 33 | 46 | 20 | 20 | 50 | 106 | 6,2 | 13 | 21 | −6 | 101,9 | 2 |
| 14 | 185 | LDPE rec. | 57 | 28 | 28 | 20 | 20 | 0 | 106 | 5 | 20 | 29 | −6 | 99,5 | 2,2 |
| 15 | 185 | LDPE rec. | 53 | 33 | 46 | 20 | 20 | 0 | 106 | 3,8 | 45 | 33 | −8 | 102,2 | 5 |
| 16 | 185 | LDPE rec. | 53 | 33 | 46 | 40 | 20 | 0 | 64 | 3,3 | >=80 | 43 | −8 | 102,2 | 2 |
| 17 | 270 | LDPE rec. | 58 | 33 | 46 | 20 | 20 | 0 | 105 | 3,3 | 63 | 42 | −9 | 102,0 | 4 |
| 18 | 270 | LDPE rec. | 30 | 33 | 46 | 20 | 20 | 0 | 106 | 3,8 | 60 | 40 | −9 | 102,0 | 4 |
| 19 | 185 | LDPE | 58 | 33 | 46 | 20 | (4) | 0 | 106 | 3,8 | 49 | 36 | −7 | 102,0 | 5 |

TABLE 3-continued

| EXAMPLE N. | BITUM. PEN. dmm | 1st POLYMER TYPE | EVA MF12 MFI | EVA VA % | EVA MFI g/10³ | EVA/(EVA + PE) % | Compos. (bit. = 100) POLIMER parts | Compos. (bit. = 100) Car. parts | P.A. °C | Viscosity dPa*s | Print. dmm | Penetr. dmm | Flex. °C | DSC °C | DSC % Cr |
|---|---|---|---|---|---|---|---|---|---|---|---|---|---|---|---|
| 20 | 185 | rec. (4) LDPE rec. | 61 | — | — | 0 | (5) | 0 | 107 | 3,8 | 37 | 35 | −8 | 102,0 | 5 |

NOTES
(2) Preparation temperature and viscosity at 200° C.
(3) LDPE rec. + PE waxes; Waxes/(Waxes + PE) = 0,4
(4) BIT:(PE + EVA):PE Waxes = 100:20:2
(5) BIT:PE:MTG = 100:20:2

TABLE 4

| Conditions °C | Conditions g | Conditions sec | EXAMPLE N. POLYMER POLYM:BIT MFI PE EVA TYPE EVA/(PE + EVA) | 1 PPA 20 | 2 PPA 23 | 3 PPA 30 | 5 SBR 14 | 7 EVA 33/45 20 33/45 100 | 13 PE + EVA 20 57 28/25 20 | 14 PE + EVA 20 53 33/45 20 | 16 PE + EVA 20 58 33/45 20 BIT. 270 | 17 PE + EVA 20 30 33/45 20 BIT. 270 |
|---|---|---|---|---|---|---|---|---|---|---|---|---|
| 23 | 1000 | 30 | | 80 | — | — | — | 77 | 20 | 45 | — | — |
| 30 | 62 | 5 | | 19 | 7 | — | — | 24 | — | — | 2 | 4 |
| 30 | 62 | 10 | | 26 | 9 | — | — | 26 | — | — | 2 | 4 |
| 30 | 62 | 20 | | 36 | 10 | — | — | 27 | — | — | 3 | 6 |
| 30 | 62 | 30 | | 43 | 12 | — | — | 28 | — | — | 4 | 8 |
| 30 | 112 | 5 | | 30 | 12 | 8 | — | 30 | — | — | 6 | 6 |
| 30 | 112 | 10 | | 42 | 16 | 8 | — | 33 | — | — | 7 | 7 |
| 30 | 112 | 20 | | 55 | 27 | 8 | — | 34 | — | — | 8 | 7 |
| 30 | 112 | 30 | | 65 | 30 | 8 | — | 36 | — | — | 9 | 7 |
| 30 | 211 | 5 | | 54 | 22 | 11 | — | 40 | 2 | 10 | 14 | 11 |
| 30 | 211 | 10 | | 70 | 33 | 13 | — | 43 | 3 | 13 | 15 | 11 |
| 30 | 211 | 20 | | >=80 | 39 | 14 | — | 45 | 4 | 15 | 16 | 12 |
| 30 | 211 | 30 | | — | 45 | 15 | — | 47 | 5 | 17 | 19 | 12 |
| 30 | 505 | 5 | | 70 | 54 | 24 | — | 66 | 9 | 10 | 30 | 20 |
| 30 | 505 | 10 | | >=80 | >=80 | 27 | — | 69 | 12 | 20 | 32 | 25 |
| 30 | 505 | 20 | | — | — | 30 | — | 71 | 15 | 25 | 34 | 29 |
| 30 | 505 | 30 | | — | — | 36 | — | 73 | 17 | 30 | 44 | 35 |
| 40 | 62 | 5 | | 45 | 22 | 7 | 22 | 36 | — | — | 7 | 6 |
| 40 | 62 | 10 | | >=80 | 27 | 7 | 25 | 41 | — | — | 7 | 6 |
| 40 | 62 | 20 | | — | 46 | 7 | 27 | 46 | — | — | 8 | 7 |
| 40 | 62 | 30 | | — | 49 | 7 | 30 | 46 | — | — | 9 | 8 |
| 40 | 112 | 3 | | >=80 | — | — | — | — | — | — | — | — |
| 40 | 112 | 5 | | — | 38 | 9 | 33 | 61 | 4 | 10 | 15 | 11 |
| 40 | 112 | 10 | | — | 45 | 10 | 38 | 62 | 6 | 13 | 18 | 11 |
| 40 | 112 | 20 | | — | 52 | 12 | 42 | 63 | 7 | 15 | 20 | 13 |
| 40 | 112 | 30 | | — | 55 | 13 | 44 | >=80 | 10 | 17 | 21 | 16 |
| 40 | 211 | 3 | | — | — | — | — | >=80 | — | — | — | — |
| 40 | 211 | 5 | | — | 72 | 18 | 51 | >=80 | 4 | 10 | 22 | 27 |
| 40 | 211 | 10 | | — | 79 | 20 | 58 | — | 7 | 20 | 25 | 35 |
| 40 | 211 | 20 | | — | >=80 | 20 | 64 | — | 14 | 25 | 33 | 39 |
| 40 | 211 | 30 | | — | — | 23 | 66 | — | 17 | 30 | 40 | 47 |
| 40 | 505 | 5 | | — | >=80 | 48 | >=80 | — | 30 | 50 | 50 | 77 |
| 40 | 505 | 10 | | — | — | >=80 | — | — | 35 | 68 | 65 | >=80 |
| 40 | 505 | 20 | | — | — | — | — | — | 41 | >=80 | 75 | — |
| 40 | 505 | 30 | | — | — | — | — | — | 50 | — | >=80 | — |
| 50 | 62 | 5 | | >=80 | 23 | 10 | 30 | >=80 | 6 | 6 | 15 | 9 |
| 50 | 62 | 10 | | — | 39 | 10 | 30 | — | 6 | 11 | 17 | 9 |
| 50 | 62 | 20 | | — | 65 | 12 | 32 | — | 7 | 14 | 27 | 9 |
| 50 | 62 | 30 | | — | >=80 | 12 | 32 | — | 10 | 22 | 32 | 12 |
| 50 | 112 | 5 | | >=80 | 35 | 17 | 43 | >=80 | 10 | 9 | 24 | 13 |
| 50 | 112 | 10 | | — | 70 | 18 | 47 | — | 12 | 20 | 31 | 19 |
| 50 | 112 | 20 | | — | >=80 | 21 | 47 | — | 12 | 27 | 42 | 20 |
| 50 | 112 | 30 | | — | — | 21 | 49 | — | 13 | 32 | 46 | 24 |
| 50 | 211 | 5 | | >=80 | >=80 | 30 | 68 | >=80 | 20 | 43 | 50 | 33 |
| 50 | 211 | 10 | | — | — | 34 | 71 | — | 20 | 50 | 71 | 43 |
| 50 | 211 | 20 | | — | — | 39 | 71 | — | 23 | 55 | >=80 | 50 |
| 50 | 211 | 30 | | — | — | 61 | 73 | — | 25 | 65 | — | 56 |
| 50 | 505 | 3 | | — | — | >=80 | — | — | — | — | — | — |
| 50 | 505 | 5 | | >=80 | >=80 | >=80 | — | >=80 | 45 | >=80 | — | >=80 |
| 50 | 505 | 10 | | — | — | — | — | — | 60 | — | — | — |
| 50 | 505 | 20 | | — | — | — | — | — | >=80 | — | — | — |
| 50 | 505 | 30 | | — | — | — | — | — | — | — | — | — |

We claim:

1. A bituminous composition consisting essentially of:

a) bitumen;
b) a recycled and/or virgin polyethylene (PE) having a density of from 0.870 to 0.970 g/ml and a Melt-Flow Index value of between and between 20 and 70;
c) a recycled and/or virgin ethylene-vinyl acetate copolymer (EVA) having a Melt-Flow Index of between 0.3 and 500 and a vinyl acetate content of between 1 and 50% by weight with respect to the total copolymer; and
d) a PE wax having a molecular weight of between 3,000 and 6,000.

2. The bituminous composition of claim 1, wherein the PE has a density within the range of 0.910 and 0.930 g/ml.

3. The bituminous composition of claim 1, wherein the composition contains 1-30 parts by weight of PE per 100 parts by weight of bitumen.

4. The bituminous composition of claim 3, wherein the composition contains 15-25 parts by weight of PE per 100 parts by weight of bitumen.

5. The bituminous composition of claim 1, wherein the EVA has a Melt-Flow Index of between 5 and 50 and a vinylacetate content of between 20 and 40%.

6. The bituminous composition of claim 1, wherein the weight ratio of the EVA to the total amount of PE and EVA is between 1 and 50%.

7. The bituminous composition of claim 6, wherein the weight ratio of EVA to the total amount of PE and EVA is between 10 and 40%.

8. The bituminous composition of claim 1, wherein the weight ratio of the PE wax to the total polymers is between 1 and 40%.

9. The bituminous composition of claim 8, wherein the weight ratio of the PE wax to total polymers is between 5 and 10%.

10. The bituminous composition of claim 1, wherein the bitumen has a penetration value of from 40 to 300 dmm according to ASTM D-5 and a ball-ring value of from 60° to 30° C. according to ASTM D-36.

11. The bituminous composition of claim 1, wherein the bitumen is obtained by vacuum distillation.

12. The bituminous composition of claim 1, further comprising one or more compatibilizing agents selected from the group consisting of fillers, pigments, stabilizers and dyes.

13. A waterproofing sheath comprising a layer of a bituminous composition according to claim 1 reinforced with a member selected from the group consisting of felts, fabrics and laminates of organic and/or inorganic materials.

14. A waterproofing sheath according to claim 13, wherein the reinforcement is a non-woven fabric of polyester or a fiberglass web.

15. A waterproofing sheath according to claim 13, having a thickness of between 2 and 8 mm.

* * * * *